US012764587B2

(12) United States Patent
Stephen et al.

(10) Patent No.: US 12,764,587 B2
(45) Date of Patent: Oct. 13, 2026

(54) METHODS FOR IMPROVING DIFFERENTIAL ENCODING BASED MEASUREMENT REPORTING

(71) Applicant: Continental Automotive Technologies GmbH, Hannover (DE)

(72) Inventors: Reuben George Stephen, Singapore (SG); David Gonzalez Gonzalez, Egelsbach (DE)

(73) Assignee: AUMOVIO Germany GmbH, Frankfurt am Main (DE)

( * ) Notice: Subject to any disclaimer, the term of this patent is extended or adjusted under 35 U.S.C. 154(b) by 159 days.

(21) Appl. No.: 18/726,844

(22) PCT Filed: Jan. 6, 2023

(86) PCT No.: PCT/EP2023/050217
§ 371 (c)(1),
(2) Date: Jul. 5, 2024

(87) PCT Pub. No.: WO2023/131671
PCT Pub. Date: Jul. 13, 2023

(65) Prior Publication Data

US 2025/0168679 A1 May 22, 2025

(30) Foreign Application Priority Data

Jan. 7, 2022 (DE) ..................... 10 2022 200 100.1

(51) Int. Cl.
*H04W 24/10* (2009.01)
*H04B 7/06* (2006.01)
(Continued)

(52) U.S. Cl.
CPC .......... *H04W 24/10* (2013.01); *H04B 7/0658* (2013.01); *H04B 17/328* (2023.05); *H04B 17/336* (2015.01); *H04L 1/0026* (2013.01)

(58) Field of Classification Search
CPC ... H04W 24/10; H04B 17/336; H04B 17/328; H04B 7/0658; H04L 1/0026
See application file for complete search history.

(56) References Cited

U.S. PATENT DOCUMENTS

2018/0219664 A1 8/2018 Guo
2020/0336196 A1 10/2020 Ku
(Continued)

FOREIGN PATENT DOCUMENTS

CN 109151882 A 1/2019
EP 3713131 A1 9/2020
WO 2019028733 A1 2/2019

OTHER PUBLICATIONS

The International Search Report and the Written Opinion of the International Searching Authority mailed on Mar. 9, 2023 for the PCT Application No. PCT/EP2023/050217 for which this application claims priority.

*Primary Examiner* — Oleg Asanbayev

(57) ABSTRACT

Differential Measurement Reporting is performed by a user equipment (UE) in a communication system. The user equipment (UE) includes a transceiver configured to receive quantities representing the quality of the transmission of the communication system to be reported and to measure the quantities to be reported. If more than two measured quality values are to be reported and are within a value set of a predefined codebook of differential values, fewer feedback bits, which are used for representing the measured quality values, are sent from the user equipment (UE), or an increase in resolution of the reported values occurs while maintaining the same number of feedback bits.

14 Claims, 7 Drawing Sheets

| Reported value | Measured quantity value (difference in measured RSRP from strongest RSRP, dB) | Current encoding | Bits used (current) |
|---|---|---|---|
| DIFFRSRP_0 | 0≥ΔRSRP>-2 | xxxxxxx (first), 0000 (later) | 7 (first), 4 (later) |
| DIFFRSRP_1 | -2≥ΔRSRP>-4 | 0001 | 4 |
| | -4≥ΔRSRP>-6 | 0010 | |
| DIFFRSRP_3 | -6≥ΔRSRP>-8 | 0011 | 4 |
| | | Total (for 4 reported values) | 19 |

(51) Int. Cl.
*H04B 17/318* (2015.01)
*H04B 17/336* (2015.01)
*H04L 1/00* (2006.01)

(56) References Cited

U.S. PATENT DOCUMENTS

2021/0111818 A1 4/2021 Zhu
2021/0360460 A1 11/2021 Taherzadeh Boroujeni

| Reported value | Measured quantity value (difference in measured RSRP from strongest RSRP, dB) | Current encoding | Bits used (current) |
|---|---|---|---|
| DIFFRSRP_0 | 0≥ΔRSRP>-2 | xxxxxxx (first), 0000 (later) | 7 (first), 4 (later) |
| DIFFRSRP_1 | -2≥ΔRSRP>-4 | 0001 | 4 |
| | -4≥ΔRSRP>-6 | 0010 | |
| DIFFRSRP_3 | -6≥ΔRSRP>-8 | 0011 | 4 |
| | | Total (for 4 reported values) | 19 |

Fig. 1

| Reported value | Measured quantity value (difference in measured RSRP from strongest RSRP, dB) | Proposed encoding | Bits used (proposed) |
|---|---|---|---|
| DIFFRSRP_0 | 0≥ΔRSRP>-2 | xxxxxxx (first) 00 (later) | 7 (first), 2 (later) |
| DIFFRSRP_1 | -2≥ΔRSRP>-4 | 01 | 2 |
| **DIFFRSRP_2** | -4≥ΔRSRP>-6 | 10 | |
| DIFFRSRP_3 | -6≥ΔRSRP>-8 | 0011 | 4 |
| | | Total (for 4 reported values) | 15 |

Fig. 2

| Reported value | Measured quantity value (difference in measured RSRP from strongest RSRP, dB) | Current encoding | Bits used (current) |
|---|---|---|---|
| DIFFRSRP_0 | 0≥ΔRSRP>-2 | xxxxxxx (first), 0000 (later) | 7 (first), 4 (later), 4, 4 |
| | | Total (for 4 reported values) | 19 |

Fig. 3

| Reported value | Measured quantity value (difference in measured RSRP from strongest RSRP, dB) | Proposed encoding | Bits used (proposed) |
|---|---|---|---|
| DIFFRSRP_0 | 0≥ΔRSRP>-2 | xxxxxxx (first)<br>No bits (later) | 7 (first), 0 (later) |
| | | Total (for 4 reported values) | 7 |

Fig. 4

| Reported value | Measured quantity value (difference in measured RSRP from strongest RSRP, dB) | Proposed encoding | Bits used (proposed) |
|---|---|---|---|
| DIFFRSRP_0_0 | 0≥ΔRSRP>-0.5 | xxxxxxx (first), 0000 (later) | 7 (first), 4 (later) |
| **DIFFRSRP_0_1** | **-0.5≥ΔRSRP>-1** | 0001 | |
| **DIFFRSRP_0_2** | **-1≥ΔRSRP>-1.5** | 0010 | |
| **DIFFRSRP_0_3** | **-1.5≥ΔRSRP>-2** | 0011 | |
| **DIFFRSRP_1_0** | **-2≥ΔRSRP>-2.5** | **0100** | **4** |
| **DIFFRSRP_1_1** | **-2.5≥ΔRSRP>-3** | **0101** | **4** |
| DIFFRSRP_1_2 | -3≥ΔRSRP>-3.5 | 0110 | 4 |
| **DIFFRSRP_1_3** | **-3.5≥ΔRSRP>-4** | **0111** | **4** |
| **DIFFRSRP_2_0** | -4≥ΔRSRP>-6 | 1000 | |
| ... | ... | ... | ... |
| **DIFFRSRP_3_0** | **-6≥ΔRSRP>-6.5** | **xxxx (first), 1100 (later)** | **4** |
| **DIFFRSRP_3_1** | **-6.5≥ΔRSRP>-7** | **xxxx (first), 1101 (later)** | **4** |
| DIFFRSRP_3_2 | -7≥ΔRSRP>-7.5 | xxxx (first), 1110 (later) | 4 |
| **DIFFRSRP_3_3** | **-7.5≥ΔRSRP>-8** | **xxxx (first), 1111 (later)** | **4** |
| | | Total (for 4 reported values) | 19 |

Fig. 5

| Reported value | Measured quantity value (difference in measured RSRP from strongest RSRP, dB) | Proposed encoding | Bits used (proposed) |
|---|---|---|---|
| DIFFRSRP_0_0 | 0≥ΔRSRP>-0.125 | xxxxxxx (first), 0000 (later) | 7 (first), 4 (later) |
| DIFFRSRP_0_1 | -0.125≥ΔRSRP>-0.25 | 0001 | 4 |
| DIFFRSRP_0_2 | -0.25≥ΔRSRP>-0.5 | 0010 | 4 |
| DIFFRSRP_0_3 | -0.5≥ΔRSRP>-0.625 | 0011 | 4 |
| DIFFRSRP_0_4 | -0.625≥ΔRSRP>-0.75 | 0100 | 4 |
| DIFFRSRP_0_5 | -0.75≥ΔRSRP>-0.875 | 0101 | 4 |
| DIFFRSRP_0_6 | -0.875≥ΔRSRP>-1 | 0110 | 4 |
| DIFFRSRP_0_7 | -1≥ΔRSRP>-1.125 | 0111 | 4 |
| DIFFRSRP_0_8 | -1.125≥ΔRSRP>-1.5 | 1000 | |
| ... | ... | ... | ... |
| DIFFRSRP_0_12 | -1.≥ΔRSRP>-6.5 | 1100 | 4 |
| DIFFRSRP_0_13 | -6.5≥ΔRSRP>-7 | 1101 | 4 |
| DIFFRSRP_0_14 | -7≥ΔRSRP>-7.5 | 1110 | 4 |
| DIFFRSRP_0_15 | -7.5≥ΔRSRP>-8 | 1111 | 4 |
| | | Total (for 4 reported values) | 19 |

Fig. 6

| Reported value | Measured quantity value (difference in measured RSRP from strongest RSRP, dB) | Current encoding | Bits used (current) |
|---|---|---|---|
| DIFFRSRP_0 | 0≥ΔRSRP>-2 | xxxxxxx (first), 0000 (later) | 7 (first), 4 (later) |
| DIFFRSRP_1 | -2≥ΔRSRP>-4 | 0001 | 4 |
| **DIFFRSRP_2** | -4≥ΔRSRP>-6 | 0010 | |
| DIFFRSRP_3 | -6≥ΔRSRP>-8 | 0011 | 4 |
| | | Total (for 4 reported values) | 19 |

Fig. 7a

| Reported value | Measured quantity value (difference in measured RSRP from strongest RSRP, dB) | Proposed encoding | Bits used (proposed) |
|---|---|---|---|
| DIFFRSRP_0 | 0≥ΔRSRP>-2 | xxxxxxx (first), 1, 000 (later) | 7+1 (first), 3 (later) |
| **DIFFRSRP_1** | -2≥ΔRSRP>-4 | 001 | 3 |
| **DIFFRSRP_2** | -4≥ΔRSRP>-6 | 010 | |
| DIFFRSRP_3 | -6≥ΔRSRP>-8 | 011 | 3 |
| | | Total | 17 |

Fig. 7b

| Reported value | Measured quantity value (difference in measured RSRP from strongest RSRP, dB) | Proposed encoding | Bits used (proposed) |
|---|---|---|---|
| DIFFRSRP_0_0 | 0≥ΔRSRP>-1 | xxxxxxx, 1 (first), 0000 (later) | 7+1 (first), 4 (later) |
| **DIFFRSRP_0_1** | -1≥ΔRSRP>-2 | xxxxxxx (first), 0001 (later) | |
| **DIFFRSRP_1_0** | -2≥ΔRSRP>-3 | 0010 | 4 |
| DIFFRSRP_1_1 | -3≥ΔRSRP>-4 | 0011 | 4 |
| **DIFFRSRP_2_0** | -4≥ΔRSRP>-5 | 0100 | |
| **DIFFRSRP_2_1** | -5≥ΔRSRP>-6 | 0101 | |
| **DIFFRSRP_3_0** | -6≥ΔRSRP>-7 | 0110 | 4 |
| DIFFRSRP_3_1 | -7≥ΔRSRP>-8 | 0111 | 4 |
| | | | 20 (Total) |

Fig. 8

METHODS FOR IMPROVING DIFFERENTIAL ENCODING BASED MEASUREMENT REPORTING

CROSS-REFERENCE TO RELATED APPLICATIONS

The present application is a National Stage Application under 35 U.S.C. § 371 of International Patent Application No. PCT/EP2023/050217 filed on Jan. 6, 2023, and claims priority from German Patent Application No. 10 2022 200 100.1 filed on Jan. 7, 2022, in the German Patent and Trademark Office, the disclosures of which are herein incorporated by reference in their entireties.

TECHNICAL FIELD

Embodiments of the invention relate to a method for improving differential encoding based measurement reporting in a wireless communication network and a network device set up to perform the method.

BACKGROUND

The fifth generation (5-Generation, 5G) communication system introduces Beam Sweeping and Beam Management because of the use of Multiple-Input Multiple-Out-put (MIMO) technology. For the downlink, the base station (gNB) transmits the reference signals of the different beams, and the user equipment (User Equipment, UE) receives the corresponding beam, completes the power measurement, and feeds back the power measurement values corresponding to the different receiving beams to the gNB according to the reporting information configured by the gNB.

The existing product solution supports the UE to report the power measurement value based on the beam group. The specific solution is as follows: The gNB configures the information about the reported power measurement value of the UE, and indicates the number of beam groups that the UE needs to report and the power corresponding to the beam included in each group of beam groups. The number of measurements. When reporting the power measurement value of the beam, the UE needs to report the gNB transmit beam ID in each beam group and the reference signal received power (RSRP) measurement value corresponding to the receive beam forming the beam pair of the transmit beam ID, and Arranged in order of RSRP measurements from largest to smallest.

In order to reduce the bit overhead of the reported RSRP measurement, the differential reporting scheme is further introduced. The UE reports the reference RSRP measurement value corresponding to each group of beams, the difference between the RSRP measurement value corresponding to other beams in the group and the reference RSRP measurement value, and the gNB transmission beam. ID.

US2021111818A1 discloses an apparatuses, methods, and systems are disclosed for determining an encoding scheme for RSRP transmission. One method includes determining multiple reference signal received power ("RSRP") values. Each RSRP value of the multiple RSRP values corresponds to a beam measurement. The method includes determining a difference between a first RSRP value of the multiple RSRP values and a second RSRP value of the multiple RSRP values. The method also includes, in response to the difference being less than or equal to a predetermined threshold, transmitting information indicating the second RSRP value using a first encoding scheme. The method includes, in response to the difference being greater than the predetermined threshold, transmitting the information indicating the second RSRP value using a second encoding scheme. The first encoding scheme is different from the second encoding scheme.

CN109151882A elates to a method for reporting RSRP (Reference Signal Receiving Power), a terminal, a computer readable medium and a system for reporting RSRP (Reference Signal Receiving Power). The method includes the following steps that: a differential quantization function configured by a base station for a terminal by using RRC (Radio Resource Control) signaling is received; differential operation is performed on adjacent RSRP measurement values based on the differential quantization function; and an operation result is reported to the base station. According to the method provided by the technical schemes of the embodiments of the invention, differential operation is performed on the adjacent RSRP measurement values, and therefore, the number of bits of differential quantization can be effectively reduced with system performance not affected, the bit overhead of reporting the RSRP measurement values can be reduced, and system efficiency can be improved.

The embodiments of WO2019028733A1 is a disclosure relate to a method, terminal device and apparatus for beam reporting and a method, network device and apparatus for receiving a beam report. In an embodiment of the present disclosure, the method for beam reporting may comprise receiving, from a network device, beam reporting configuration information indicating a number of beam quality thresholds to be used in beam reporting; and transmitting information on a beam quality pattern to the network device, wherein the beam quality pattern indicates a quality relationship of respective beams with respect to the beam quality thresholds. With embodiments of the present disclosure, it is possible to reduce the range of differential beam quality values in differential reporting and at the same time, it may provide a compact beam quality reporting solution.

US2018219664A1 describes method for reporting channel information by a user equipment (UE) is provided. The method comprises receiving, by the UE, configuration information from a base station (BS), the configuration information indicating K channel state information (CSI) reference signal (RS) resources configured, by the BS, for measurement by the UE; measuring, by the UE, a layer one (LI) reference signal received power (RSRP) for one or more of the K CSI-RS resources; selecting, by the UE, N of the K CSI-RS resources for reporting in a reporting instance; generating, by the UE, a report for the N CSI-RS resources, the generated report including a CSI-RS resource index (CRI) for each of the N CSI-RS resources, a L1-RSRP value for one of the N CSI-RS resources having a largest L1-RSRP, and a differential L1-RSRP value for each of the other of the N CSI-RS resources; and transmitting, by the UE, the generated report to the BS in the reporting instance.

US2020336196A1 discloses an embodiment of the present specification, which may provide a method for performing a sequential beam report procedure for multiple beams by a terminal in a wireless communication system. More particularly, the method comprises the steps of: receiving information for a sequential beam report procedure from a base station; measuring, using a signal received from the base station, downlink qualities of multiple beams serviced by the base station; encoding, in descending order, downlink quality measurement results of best M beams among the multiple beams, the downlink qualities of which have been measured; and transmitting the encoded information to the base station so as to perform the sequential beam report procedure.

Prior art offers several potential solutions for differential reporting of L1-RSRP for beam management:

i. differential reporting with fixed reference value, ii. differential reporting with multiple fixed reference values, iii. differential reporting of consecutive differences among values within a beam and across beams, iv. differential reporting by partitioning differential values into different subsets with different encoding based on a correlation metric, v. differential reporting with alternative encoding if differential value is beyond-30 dB of reference.

BRIEF SUMMARY

The proposed solution is a modification to differential encoding for RSRP or SINR feedback, to either reduce the number of bits fed back, or to improve the resolution within the relevant range of values to be reported. This solution can be applied to any differential encoding scheme in general. It is always desirable to reduce the number of feedback bits in measurement reports, to reduce signaling overhead.

This is especially significant when there are many beams to be searched for (e.g. in frequency range 2 (FR2) and/or when the reporting interval is small.

In other situations, it may be useful to get more resolution in the measured values (e.g., if all the reported values lie close to each other, it will be beneficial if the gNB can get more granular information on how close they are to each other).

The proposed solution directly addresses this need with a modification to the way in which the differential encoding is done, without sacrificing accuracy of the current scheme.

Alternatively, for the same number of feedback bits, the scheme can achieve better resolution in a subset of the fed back values.

None of the prior art uses the potential for reducing the number of feedback bits based on the range of values to be reported.

Even for the method described in the prior art using consecutive differences, the encoding of the differences needs to be fixed, regardless of the actual dynamic range of the values.

Embodiments of the invention propose the improvement of the efficiency or increase in the accuracy of measurement reporting in 5G NR and beyond and in any feedback scheme that uses differential encoding, whenever the number of values to be reported is greater than 2. For 5G NR in particular, the proposed scheme can be implemented with minimal changes to the current reporting format.

The inventive method exploits the dynamic nature of the range of values to be reported, by reporting the maximum and minimum value first, and then using a suitable codebook based on this range and is easily implementable with a minimal modification to the gNB and UE operation when compared to current specifications.

The solution is an adaptive encoding/decoding scheme, that improves the current differential encoding scheme for measurement reporting in the specifications. It can provide a saving in the number of bits fed back for measurement reporting (without a loss of accuracy compared to the current scheme) or increase the resolution of a subset of the values reported (without any increase in the number of feedback bits), whenever there are more than two values to be reported in a differential format. It works by changing the order in which the values are reported, so that the transmitter (and receiver) can infer and use a new (reduced size or improved resolution) codebook to encode (and decode) the remaining reported values.

One solution of the described problem is represented by the embodiment of the method for Differential Measurement Reporting between a user equipment (UE) in a communication system wherein the user equipment: (UE) comprising a transceiver configured to receive quantities representing the quality of the transmission of the communication system measures the quantities to be reported, characterized by, that if more than two measured quality values are to be reported and are within a value set of a predefined codebook of differential values a reduction of the number of feedback bits send from user equipment (UE) used for the representation of the measured quality values is proceeded.

The described problem is solved by one embodiment of the method for Differential Measurement Reporting characterized by, that a user equipment (UE) sends a maximum value of the number of feedback bits coded and sends a minimum value among number of values to be reported. Maximum value of the number of feedback bits can be x_1 and maximum value of the number of feedback bits can be x_2 in general. The first value is an absolute value and the second value is a differential value representing the difference of the second value from the first absolute value being used as a reference. So the number of bits required to represent the second value will be less than that required for the first, i.e., $x\_2<x\_1$. The communication system determines the number of levels in-between the maximum value and the minimum value based on its own prior knowledge of the original codebook and generates a reduced feedback codebook for encoding the reduced number of levels between the maximum value and minimum value reported by the user equipment (UE). The user equipment (UE) sends then the remaining measured quality values with reduced number of bits according to the reduced number of levels according to the reduced feedback codebook.

Another embodiment of the method is characterized by, that user equipment (UE) sending one additional bit after sending the maximum value among the values to be reported, the additional bit indicating if the minimum value among the values to be reported lies in the same half value set of the predefined codebook of differential values as the maximum value and if maximum value and minimum value are in the same half value set of the predefined codebook of differential values, user equipment (UE) uses 1 bit less for coding for the remaining measured quality values of the feedback bits and transmits them.

Another embodiment of the method is characterized by characterized by, that a reduction of the number of feedback bits sent from user equipment (UE) used for the representation of the measured quality values isn't proceeded, the resolution of the measured quality values is increased.

Another embodiment of the method is characterized by characterized by, that user equipment (UE) sending the remaining measured quality values of the feedback bits with the same number of bits, wherein the remaining measured quality values of the feedback bits are in a limited range.

Another embodiment of the method is characterized by characterized by, that if maximum value and minimum value are in the same half value set of the predefined codebook of differential values, the resolution of the measured quality values is increased.

Another embodiment of the method is characterized by characterized by, that if the predefined codebook of the differential values is a 4-bit codebook.

Another embodiment of the method is characterized by characterized by, that if quantities representing the quality of the transmission is the Reference Signal Received Power (RSRP).

Another embodiment of the method is characterized by, that the quantities representing the quality of the transmission is the Signal to Interference plus Noise Ratio (SINR).

Another embodiment of the method is characterized by, that quantities representing the quality of the transmission is the Reference Signal Received Power (RSRP) and the Signal to Interference plus Noise Ratio (SINR);

The described problem is solved by one embodiment of the method for Differential Measurement Reporting performed by a base station (gNB) in a wireless communication systems, characterized by, that base station (gNB) configures an indicator for differential encoding, the indicator for encoding is integrated in an indicator representing the quality of a channel and if the number of measured reference signals resources to be reported per report setting for the user equipments is more than 2, the base station checks if number of measured reference signals resources to be reported per report setting is more than 1 or a group beam based reporting is turned on and if number of measured reference signals resources to be reported per report setting is still more than 2, the indicator for differential encoding is checked according to the interaction with the user equipment, wherein if the indicator for differential encoding is set the base station (gNB) uses a reduced feedback codebook, otherwise the base station (gNB) uses an improved resolution codebook.

The described problem is solved by an apparatus for Differential Measurement Reporting performed by a user equipment by a user equipment (UE) in a wireless communication system, the apparatus comprising a wireless transceiver, a processor coupled with a memory in which computer program instructions are stored, said instructions being configured to implement steps.

The described problem is solved by an apparatus for Differential Measurement Reporting performed by a base station (gnB) in a wireless communication system, the apparatus comprising a wireless transceiver, a processor coupled with a memory in which computer program instructions are stored, said instructions being configured to implement steps.

The described problem is solved by user Equipment (UE) comprising an apparatus.

The described problem is solved by a base station (gNB) comprising an apparatus.

The described problem is solved by a wireless communication system for congestion reducing from a base station (gNB) to a user equipment (UE), wherein the base station comprises a processor coupled with a memory in which computer program instructions are stored, said instructions being configured to implement steps, wherein the user equipment (UE) comprises a processor coupled with a memory in which computer program instructions are stored, said instructions being configured to implement steps.

The described problem is also solved by a computer program product, comprising commands which, when executed by a computer, cause it to execute the method according to one or more of claims.

The described problem is also solved by a computer-readable data carrier on which the computer program product is stored.

The described problem is also solved by vehicle with at least one microprocessor and an apparatus.

A user equipment (UE) set up to control broadcast access to a communication medium shared by network devices includes a communication interface set up to optionally access the shared communication medium. Optional access includes sending or receiving messages or transmissions over the shared communication medium. The A user equipment (UE) also includes a timer module that can be set by a synchronization signal fed to the network device. The synchronization signal can, for example, be supplied by a receiver of a satellite navigation system coupled to the A user equipment (UE), or by a receiver that wirelessly receives a signal of a time reference. The A user equipment (UE) also includes a microprocessor and volatile and/or non-volatile memory associated with it. The memory contains computer program instructions which, when executed by the microprocessor, execute one or more embodiments and further developments of the method described above.

A computer program product according to embodiments of the invention contains accordingly commands which, when executed by a computer, cause it to execute one or more embodiments and further developments of the method described above.

The computer program product may be stored on a computer-readable medium. The data carrier may be physically embodied, for example as a hard disk, CD, DVD, flash memory or the like, but the data carrier may also include a modulated electrical, electromagnetic or optical signal that can be received by a computer by means of a corresponding receiver and stored in the memory of the computer.

A vehicle with a network device according to embodiments of the invention can form a group with other suitably equipped vehicles that are within communication range, which exchange messages or information via a shared communication medium, for example about a condition of a roadway or dangerous situations located on a road ahead. In this case, land, air or water vehicles can communicate equally with each other, provided that they have a network device according to embodiments of the invention. For example, drones in the airspace above a road can transmit information about the road to cars or trucks. In addition, a fixed device on a road or other location may be used to form a group with vehicles in range, at least temporarily, for example e.B to exchange messages or information via a shared communication medium.

BRIEF DESCRIPTION OF THE DRAWINGS

In the following, embodiments of the invention are explained in more detail on the basis of the embodiments with reference to the accompanying figures. All figures are purely schematic and not scaled.

FIG. 1 shows the known current scheme.

FIG. 2 shows the approach of the method.

FIG. 3 shows the known current scheme for encoding.

FIG. 4 shows the extreme Cases.

FIG. 5 shows the Improved Resolution.

FIG. 6 shows the Improved Resolution and extreme cases.

FIG. 7*a* shows the feedback reduction known from prior art.

FIG. 7*b* shows the second embodiment of feedback reduction.

FIG. 8 shows the second embodiment for the Improved Resolution.

DETAILED DESCRIPTION

Figure 9:
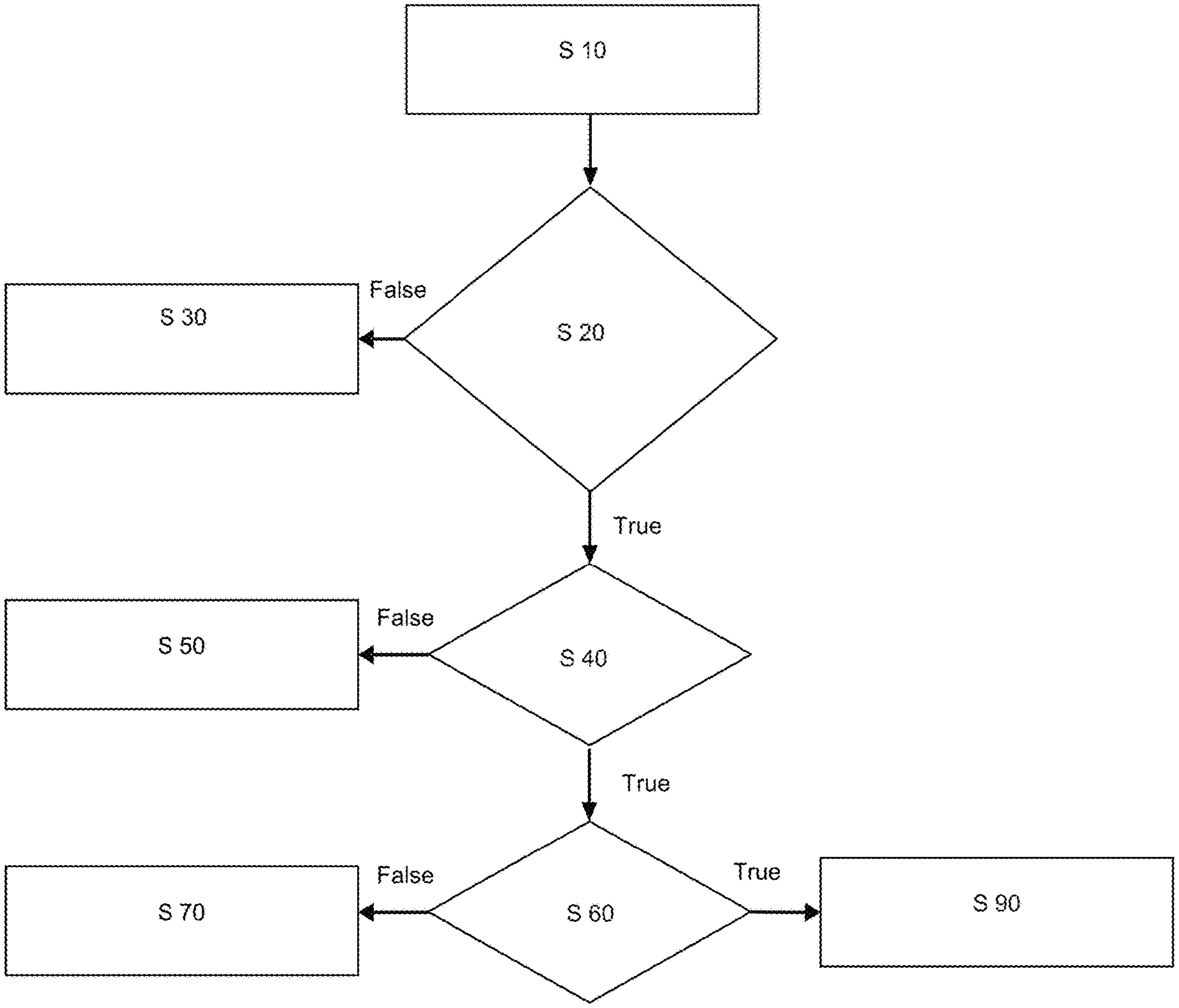
FIG. 9 shows the inventive method flow chart.

Embodiments of the invention concern differential encoding-based measurement reporting by user equipment (UE) as defined as an example in the 3rd Generation Partnership Project (3GPP) specifications for 5th Generation (5G) New Radio (NR).

Embodiments of the invention propose a method to improve the efficiency or increase the accuracy of measurement reporting in 5G NR that uses differential encoding, whenever the number of values to be reported is greater than 2, with minimal changes to the current reporting format. Details of the solution can be found in the following FIGS. 1 to 9.

The same or similar elements are provided with the same or similar reference signs in the figures.

The detailed description set forth below, with reference to annexed drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In particular, although terminology from 3GPP 5G NR may be used in this disclosure to exemplify embodiments herein, this should not be seen as limiting the scope of the invention.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments, a more general term "network node" may be used and may correspond to any type of radio network node or any network node, which communicates with a UE (directly or via another node) and/or with another network node. Examples of network nodes are NodeB, MeNB, ENB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. Mobile Switching Center (MSC), Mobility Management Entity (MME), etc.), Operations & Maintenance (O&M), Operations Support System (OSS), Self Optimized Network (SON), positioning node (e.g. Evolved-Serving Mobile Location Centre (E-SMLC)), Minimization of Drive Tests (MDT), test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, UE category M1, UE category M2, ProSe UE, V2V UE, V2X UE, etc.

Additionally, terminologies such as base station/gNodeB and UE should be considered non-limiting and do in particular not imply a certain hierarchical relation between the two; in general, "gNodeB" could be considered as device 1 and "UE" could be considered as device 2 and these two devices communicate with each other over some radio channel. And in the following the transmitter or receiver could be either gNodeB (gNB), or UE.

The same or similar elements are provided with the same or similar reference signs in the figures.

The 5G NR (New Radio) is the latest in the series of 3GPP standards which supports very high data rate with lower latency compared to its predecessor LTE (4G) technology. 5G NR supports FR1 and FR2 frequency bands. FR1 is sub-6 GHz, from 450 to 6000 MHz whereas FR2 is mmwave band (from 24.25 GHz to 52.6 GHz).

As the mmwave band uses very high frequency, it leads to propagation loss and other losses. To compensate for the losses, directional communication is essential at such frequencies. Antenna arrays with large number of antenna elements make it possible due to smaller wavelengths. This concept provides beamforming gain to the RF link budget which helps in compensation of propagation loss. Moreover, large antenna array helps to achieve higher data rate due to spatial multiplexing technique.

These directional links require accurate alignment of transmitted and received beams. In order to achieve alignment of beam pair and to have required end to end performance with desired delay, beam management operations are introduced in the 5G NR. Beam management operations are essential during Initial Access (i.e. IDLE mode) when UE is not in connection with gNB and during tracking (i.e. CONNECTED mode) when UE is exchanging data with the gNB (i.e. network). Beam management procedure is used in 5G NR in order to acquire and maintain a set of TRxP(s) and/or UE beams which can be used for DL and UL transmission/reception. TRxP stands for Transmission Reception Point.

Beam management is an important part of cellular operations based on the 5G NR Specifications. It refers to evaluation of the quality of the received signal at the gNB or at the UE. Different metrics could be used such as RSRP, RSRQ and SINR or SNR for this purpose. Beam Management Implementation in 5G NR is done in both downlink (from gNB to UE) and uplink (from UE to gNB) of the 5G NR system. The system uses different reference signals for beam management. It uses PSS/SSS/PBCH DMRS (i.e.

SSB) during RRC_IDLE state. It uses CSI-RS (in the downlink) and SRS (in the uplink) during. RRC_CONNECTED state.

Beam management procedures typically depend on measurement reporting by the user equipment (UE).

A user equipment (UE) in the RRC_CONNECTED state derives cell measurement results by measuring one or multiple beams associated per cell as configured by the network. For cell and beam measurements, reporting quantities can be any combination of quantities e.g. only Reference Signal Received Power (RSRP); only Signal to Interference plus Noise Ratio (SINR); RSRP and SINR; etc.

L1-RSRP reporting is an important part of beam management in 5G NR. If higher layer parameter nrofReportedRS in CSI-ReportConfig is configured to be one, reported L1-RSRP value is defined by a 7-bit value in the range [−140, −44] dBm with 1 dB step size. If nrofReportedRS is configured to be larger than one, or if higher layer parameter groupBasedBeamReporting is configured as 'enabled', UE shall use differential L1-RSRP based reporting.

Largest measured value of L1-RSRP is quantized to a 7-bit value in the range [−140, −44] dBm with 1 dB step size.

Differential L1-RSRP is quantized to a 4-bit value and computed with 2 dB step size with a reference to the largest measured L1-RSRP value which is part of the same L1-RSRP reporting instance. The shows Reporting range of differential SS-RSRP and CSI-RSRP for L1 reporting and L3 reporting is defined from 0 dB to −30 dB with 2 dB resolution. Similar differential encoding is used for SINR reporting as well.

In 5G NR, RSRP measurement is performed and reported at Layer 1 (Physical Layer) and Layer 3 (RRC Layer). For example, 5G capable device can provide SS-RSRP measurements at Layer 1 when sending Channel State Information (CSI) and at Layer 3 when sending an RRC: Measurement Report to gNB. To generate SS-RSRP measurement results, 5G UE is allowed to measure PBCH-DMRS signal. DMRS and SS signals are transmitted with equal power so results can be averaged.

While performing SS-RSRP measurements for L1, UE can be configured to measure CSI-RS as well. CSI-RS may be transmitted with different transmit power compared to Sync Signals (SS) and PBCH-DMRS. In this case gNB shall provide offset information to UEs so that it can be taken into account during the measurement.

Measurement Characteristics for Layer 3 (L3) Measurement can be described as that L3 measurements are useful for radio resource management decisions which require a long-term view of channel conditions, e.g. handover procedures should be triggered after Layer 3 filtering to reduce the risk of ping-pong between serving cells.

Measurements are filtered at Layer 3 to remove the impact of fast fading and to help reduce short term variations in results. L3 measurements can be either 'beam level' or 'cell level' which can be reported within an RRC message.

Measurement Report (MR) can be obtained by beam level measurements are generated directly from the L1 measurements by applying L3 filtering. Cell level measurements are derived from the L1 measurements using the certain rules. L3 SS-RSRP reporting range is defined from −156 dBm to −31 dBm with 1 dB resolution. L3 report requires 7 bits payload to represent 128 value mapped to RSRP in dB.

L1 measurements are useful for procedures which must react with minimal delay, e.g. beam management procedures which require the UE to rapidly switch between beams. Measurements are filtered at Layer 1 to help remove the impact of noise and to improve measurement accuracy. L1 measurements are 'beam level'. L1 SS-RSRP and CSI-RSRP reporting range is defined from −140 to −40 dBm with 1 dB resolution. L1 measurement requires 7 bits payload to represent 128 value mapped to RSRP in dB.

The range of differential SS-RSRP and CSI-RSRP for L1 reporting and L3 reporting well known. In current differential encoding scheme, 4 bits are used for all the differential values (if the number of values to be reported is more than 1).

L3 measurement for SS-RSRP reporting range is defined from −156 dBm to −31 dBm with 1 dB resolution.

Reported value of 0 means SS-RSRP is greater or equal to −156 dB. Reported value of 126 means SS-RSRP is less than or equal −31 dBm. RSRP value rough estimation can be done with following rule formula:

$$RSRP\ \text{value} = \text{Reported Value} - 156$$

$$RSRP\ \text{in dBm} = 111 - 156 = -45\ \text{dBm}$$

L1 measurement for SS-RSRP and CSI-RSRP reporting range is defined from −140 dBm to −40 dBm with 1 dB resolution.

Reporting range value of 0 to 16 and 113 to 127 is not valid for L1 measurement. Reported value of 17 means SS-RSRP is greater or equal to −156 dB. Reported value of 112 means SS-RSRP is less than or equal-45 dBm RSRP value rough estimation can be done with following rule formula:

$$RSRP\ \text{value} = \text{Reported Value} - 156$$

$$RSRP\ \text{in dBm} = 18 - 156 = -138\ \text{dBm}$$

The reporting range of differential SS-RSRP and CSI-RSRP for L1 reporting is defined from 0 dBm to −30 dB with 2 dB resolution.

However, if the minimum among reported values is close to the maximum, it is not needed to use 4 bits to represent each of the reported values.

Proposed scheme provides a method to potentially reduce the number of bits used for the values if there are more than 2 values to be reported, and the range of values do not span the whole 4-bit codebook of the differential values.

Alternatively, if the number of feedback bits do not need to be reduced, the resolution of the values can be increased.

FIG. 3 shows the current scheme, which is normally proceeded the quantization of differential values.

FIG. 4 shows inventive method with user equipment (UE) sends max value with 7 bits first. User equipment (UE) UE sends minimum value among number of values to be reported with 4 bits. Since table and number of values to be reported is known to base station (gNB), from maximum and minimum value, gNB can deduce how many levels are in-between, and the encoding for this reduced range. Furthermore, user equipment (UE) sends remaining values with reduced number of bits. Example for savings is for 4 bits 21%, without any loss of accuracy from current scheme in contrary to the scheme in FIG. 3 known from the prior art.

FIG. 2 shows one approach of the method. If max and min value fall in the same interval of the 7-bit table, one gets savings of 19−7=8 bits. This means 42%, without any loss of accuracy from current scheme.

FIG. 3 shows the feedback Reduction shows the Maximum savings. Minimum savings are achieved if difference of min value from max is >=−30 dB, then no savings are possible.

FIG. 4 shows the extreme cases for the determination of the possible coding gain.

FIG. 5 shows the improved Resolution, with the steps 1 and 2 with user equipment (UE) sends max value with 7 bits first. User equipment (UE) sends minimum value among number of values to be reported with 4 bits. User equipment (UE) sends remaining values with same number of bits (4). Since all the remaining values lie within a limited range, their resolution is increased. This example increases in accuracy for 3rd value onwards: within 0.5 dB instead of within 1 dB (4 times, with no increase in feedback bits compared to existing scheme).

FIG. 6 shows the Improved Resolution and extreme cases with maximum accuracy, if max and min value fall in the same interval of the 7-bit table, get max accuracy for 3rd and 4th values of within 0.125 dB instead of within 2 dB (16 times) and Minimum accuracy, If difference of min value from max is >=−30 dB, then accuracy of $3^{rd}$ and $4^{th}$ value remains within 2 dB.

FIG. 7*a* shows the feedback reduction and FIG. 7*b* shows the inventive feedback reduction. User equipment sends max value with 7 bits first, instead of sending minimum value first, User equipment (UE) sends 1 additional bit after the maximum value, indicating if minimum value lies in the same half of original table as maximum (1 if yes, 0 if no). If both maximum and minimum lie in same half, User equipment (UE) can use 1 bit less for each of the remaining differential values, otherwise, use the original scheme is continued. Example savings are: 2 bits (10%).

FIG. 8 shows the second embodiment for the Improved Resolution

Steps 1 and 2 remain same.

3. UE sends remaining values with same number of bits (4);
4. If both maximum and minimum lie in same half, their resolution is increased;
5. Otherwise, resolution is same as original scheme, but costs 1 additional bit.

Example increase in accuracy: within 1 dB instead of within 2 dB (with 1-bit increase in total feedback bits compared to existing scheme).

FIG. 9 shows the inventive method flow chart. Base station (gNB) configures an indicator for differential encoding, the indicator for encoding is integrated in an indicator representing the quality of a channel (S10) and if the number of measured reference signals resources to be reported per report setting for the user equipment is more than 2 (S10), the base station checks if number of measured reference signals resources to be reported per report setting is more than 1 or a group beam based reporting is turned on (S20) and if number of measured reference signals resources to be reported per report setting is still more than 2, the indicator for differential encoding is checked (S50) according to the interaction with the user equipment, wherein if the indicator for differential encoding is set the base station (gNB) uses a reduced feedback codebook (S90), otherwise the base station (gNB) uses an improved resolution codebook (S70).

For sake of completeness the definition of the steps with the correlated functionality is as follows:

Step 10 (S10): gNB configures diffEncType bit in CSI-ReportConfig if nrofReportedRS>2;

Step 20 (S20): If (nrofReported RS>1) or (groupBasedBeamReporting==true);

Step 30 (S30): False: gNB and UE do not use differential encoding;

Step 40 (S40): If (nrofReport edRS>2),

Step 50 (S50): gNB and UE ignore diffEncType and use current differential encoding;

Step 60 (S60): If (diffEncType==true),

Step 70 (S70): gNB and UE use improved resolution codebook; and

Step 90 (S90): gNB and UE use reduced feedback codebook.

The term nrofReportedRS describes that the number (N) of measured RS resources to be reported per report setting in a non-group-based report. N<=N_max, where N_max is either 2 or 4 depending on UE capability. When the field is absent the UE applies the value 1 and is defined in 3gpp specifications.

The concept of group-based beam management is to manage beams in group basis instead of beam-by-beam basis, considering that beams sharing similar channel properties can be put into the same beam group.

With group-based reporting, a UE can help a TRP to identify multi-path observed by the UE and let the TRP know the UE beam information implicitly.

Group based reporting means that the N downlink Tx beams in a reporting instance can be received simultaneously by the UE by multiple receive panels. This means that the subsequent DL transmission can be scheduled with up to N downlink Tx beams. For instance, the UE enables two antenna panels to simultaneously receive two independent Tx beams, which experience a line-of-sight (LOS) path and a strong non-line-of-sight (NLOS) path, respectively.

Non group-based reporting means that the UE reports the N downlink beams with the N-best received power without further UE assumption about simultaneous reception for these N beams. In the other word, the subsequent DL transmission can only be performed with only one Tx beam selected from the N beams since TRP does not know which beams can be simultaneously received by the UE.

Therefore, the term groupBasedBeamReporting means turning on/off group beam-based reporting. Based on TS 38.214-5.2.1.4.2, it can be summarized as follows.

Enabled means: UE shall report different CRI or SSBRI for each report setting in a single report nrofReportedRS; and Disabled means: UE shall report in a single reporting instance two different CRI or SSBRI for each report setting, where CSI-RS and/or SSB resources can be received simultaneously by the UE either with a single spatial domain receive filter, or with multiple simultaneous spatial domain receive filters.

The described method can be summarized in a pseudocode representation.

Type of encoding for reduced feedback and/or improved resolution) can be indicated via a new 1-bit field diffEncType in CSI-ReportConfig basestation (gNB) configures diffEncType bit in CSI-ReportConfig if nrofReportedRS>2, 1. if (nrofReported RS>1) or (groupBasedBeamReporting==true) and if (nrofReportedRS>2) and if (diffEncType==true), basestation (gNB) and UE use reduced feedback codebook;
2. if (nrofReported RS>1) or (groupBasedBeamReporting==true) is false, gNB and UE do not use differential encoding;
3. if (nrofReported RS>1) or (groupBasedBeamReporting==true) is true and If (nrofReportedRS>=2) is false, basestation (gNB) and UE ignore diffEncType and use current differential encoding;

4. if (nrofReported RS>1) or (groupBasedBeamReporting==true) is true and If (nrofReportedRS>=2) is true and If (diffEncType==1) is false, basestation (gNB) and UE use improved resolution codebook (case 2 of solution 1 or solution 2).

In another embodiment of the methods for Improving Differential Encoding based Measurement Reporting Data Transmission performed by a user equipment (UE) in a wireless communication system, for reporting channel information, the UE comprising a transceiver configured to receive configuration information from a basestation (gNB), the method comprising receiving from a base station (gNB), information on propagation delay; transmitting, to the base station (gNB) a random access preamble; and operating a power-saving mode during the duration of the propagation delay, wherein the power-saving mode is activated until a random access response is received, wherein a transceiver configured to receive configuration information from a base station (gNB), the configuration information indicating K channel state information (CSI) reference signal (RS) resources configured, by the gNB, for measurement by the UE. A processor operably connected to the transceiver, the processor configured to: measure a layer one (L1) reference signal received power (RSRP) for one or more of the K CSI-RS resources; select N of the K CSI-RS resources for reporting in a reporting instance; and generate by the UE a report for the N CSI-RS resources, the generated report including a CSI-RS resource index (CRI) for each of the N CSI-RS resources, a L1-RSRP value for one of the N CSI-RS resources having a largest L1-RSRP, and a differential L1-RSRP value for each of the other of the N CSI-RS resources, the transceiver is further configured to transmit the generated report to the base station (gNB) in the reporting instance.

The generation and the usability of the different codebooks generated are described as the base station (gNB) configures diffEncType bit in CSI-ReportConfig if (nrofReportedRS>2), if (nrofReported RS>1) or (groupBasedBeamReporting==true) and if (nrofReport edRS>2) and if (diffEncType==true), base station (gNB) and UE use reduced feedback codebook, if (nrofReported RS>1) or (groupBasedBeamReporting==true) is false, gNB and UE do not use differential encoding, if (nrofReported RS>1) or (groupBasedBeamReporting==true) is true and if (nrofReportedRS>=2) is false, basestation (gNB) and UE ignore diffEncType and use current differential encoding. And if (nrofReported RS>1) or (groupBasedBeamReporting==true) is true and If (nrofReportedRS>=2) is true and If (diffEncType==1) is false, basestation (gNB) and UE is using the improved resolution codebook.

Base station (gNB) and UE uses reduced feedback codebook, the reduced feedback codebook is changed in such a manner that if (nrofReported RS>1) or (groupBasedBeamReporting==true) and if (nrofReport edRS>2) and if (diffEncType==true), UE sends max value with 7 bits first, UE sends minimum value among number of values to be reported with 4 bits, since table and number of values to be reported is known to gNB, from maximum and minimum value, gNB can deduce how many levels are in-between, and the encoding for this reduced range UE sends remaining values with reduced number of bits or UE sends remaining values with same number of bits (4) If both maximum and minimum lie in same half, their resolution is increased otherwise, resolution is same as original scheme, but costs 1 additional bit.

Overall, the proposed method can be used to reduce the feedback bits or increase the resolution of the fed back quantities (per reporting instance).

This is achieved without any additional feedback, but gNB and UE need to use a different codebook (configured a priori) to encode/decode the values other than the maximum and minimum.

Configuration of additional codebook can be done via CSI report setting. The embodiment requiring 1 additional bit of feedback per reporting instance but can achieve an overall reduction in feedback bits or an increase in resolution. gNB and UE do not need to use an additional codebook if only the usage using solution 2 for reduced feedback only.

The effectiveness of both the solutions increases with the total number and/or relative closeness of the values to be fed back.

The savings in feedback is achieved in each reporting instance, without reducing accuracy, thus in general it is beneficial for any reporting interval setting.

However, the gNB and UE can decide to not use this scheme (e.g. for longer reporting periods where overhead may be minimal in the first place).

The solutions are implementable with minimal modification to the current specifications.

Although the method according to embodiments of the invention has been described above with reference to wirelessly networked network devices, it is also possible to use the method in a network device connected by a wired bus, for example in a vehicle. In the case of wired networked networked network devices, a dynamic change in configuration, which is also covered by the procedure, is rather unlikely, but not excluded. For example, network devices could be connected to each other via the bus, which independently switch between active and inactive modes and do not monitor communication in inactive mode in order to save energy.

An application of the method described herein is not limited to vehicles or generally mobile network devices, but it can be used in all cases in which network devices temporarily organize themselves in changing groups, e.g., in smart factories or the like.

Potential reduction in feedback or improvement in accuracy: The method provides an option to reduce the number of bits being fed back or improve the resolution when performing measurement reporting using differential encoding whenever there are more than two values to be reported.

Easily implementable in current 3GPP specifications: The method only involves a change in the order in which the values are being reported, and an optional additional bit in the signaling of the CSI report settings which can be implemented without much modification in the 3GPP specifications.

The method can be used in different ways for different UEs (and/or at different points in time) to provide feedback reduction for some UEs (and/or at some times) and improved resolution for other UEs (and/or at other times).

The invention claimed is:

1. A method for Improving Differential Encoding based Measurement Reporting for Transmission between a user equipment (UE) in a wireless communication system wherein the user equipment (UE) comprising a transceiver configured to receive quantities representing a quality of a transmission of the wireless communication system, the quantities are reported, wherein, the user equipment (UE) measures the receive quantities by performing operations comprising:

determining more than two measured quality values are reported and are within a value set of a predefined codebook of differential values, in response to determining, a reducing a number of feedback bits sent from the user equipment (UE), the feedback bits representing the measured quality values is proceeded; wherein the user equipment (UE) sends a maximum value of the number of feedback bits coded and sends a minimum value among number of values to be reported, wherein the wireless communication system determines a number of levels in between the maximum value and the minimum value among the quality values to be reported and generates a reduced feedback codebook for decoding remaining values based on its prior knowledge of the number of levels between the maximum values and the minimum values in an original codebook user equipment (UE); and generating the same reduced feedback codebook based on its prior knowledge of the number of levels between the maximum values and the minimum values in the original codebook and sending the remaining measured quality values by encoding them with reduced number of bits according to the reduced feedback codebook.

2. The method according to claim 1 wherein:

the user equipment (UE) sending one additional bit after sending the maximum value, indicating the minimum value among the values to be reported subsequently lies in a same half value set of the predefined codebook of differential values as the maximum value, and the maximum value and the minimum value are in the same half value set of the predefined codebook of differential values, the user equipment (UE) uses 1 bit less for encoding the remaining measured quality values and transmits them using the encoding and omitting a most significant bit in the original predefined codebook.

3. The method according to claim 1, wherein a reduction of the number of feedback bits sent from the user equipment (UE) used for the representation of the measured quality values isn't proceeded, a resolution of the measured quality values is increased.

4. The method according to claim 3, wherein the user equipment (UE) sending the remaining measured quality values of the feedback bits with a same number of bits, wherein the remaining measured quality values of the feedback bits are in a limited range.

5. The method according to claim 4, wherein if the maximum value and the minimum value are in a same half value set of the predefined codebook of differential values, the resolution of the measured quality values is increased.

6. The method according to claim 5, wherein the predefined codebook of the differential values is a 4-bit codebook.

7. The method according to claim 1, characterized by, wherein the quantities representing the quality of the transmission are a Reference Signal Received Power (RSRP).

8. The method according to claim 1, wherein the quantities representing the quality of the transmission are a Signal to Interference plus Noise Ratio (SINR).

9. The method according to claim 1, wherein the quantities representing the quality of the transmission are a Reference Signal Received Power (RSRP) and a Signal to Interference plus Noise Ratio (SINR).

10. An apparatus for Differential Measurement Reporting performed by a user equipment (UE) in a wireless communication system, the apparatus comprising a wireless transceiver, a processor coupled with a memory in which computer program instructions are stored, said instructions being configured to, when executed by the processor, cause the apparatus to improve Differential Encoding based Measurement Reporting for Transmission between the user equipment (UE) in the wireless communication system wherein the user equipment (UE) includes the wireless transceiver configured to receive quantities representing a quality of a transmission of the wireless communication system, the quantities are reported and wherein the user equipment (UE) measures the receive quantities by performing operations comprising:

determining more than two measured quality values are reported and are within a value set of a predefined codebook of differential values, in response to determining, initiating a reduction of a number of feedback bits sent from the user equipment (UE), the feedback bits representing a presentation of the measured quality values; and wherein the user equipment (UE) sends a maximum value of the number of feedback bits coded and sends a minimum value among number of values to be reported, wherein the wireless communication system determines a number of levels in between the maximum value and the minimum value among the quality values to be reported and generates a reduced feedback codebook for decoding remaining values based on its prior knowledge of the number of levels between the maximum values and the minimum values in an original codebook user equipment (UE); and generates the same reduced feedback codebook based on its prior knowledge of the number of levels between the maximum values and the minimum values in the original codebook and sends the remaining measured quality values by encoding them with reduced number of bits according to the reduced feedback codebook.

11. The apparatus according to claim 10, wherein: the user equipment (UE) sending one additional bit after sending the maximum value, indicating the minimum value among the values to be reported subsequently lies in a same half value set of the predefined codebook of differential values as the maximum value, and the maximum value and the minimum value are in the same half value set of the predefined codebook of differential values, the user equipment (UE) uses 1 bit less for encoding the remaining measured quality values and transmits them using the encoding and omitting a most significant bit in the original predefined codebook.

12. The apparatus according to claim 10, wherein a reduction of the number of feedback bits sent from the user equipment (UE) used for the representation of the measured quality values isn't proceeded, a resolution of the measured quality values is increased.

13. The apparatus according to claim 12, wherein the user equipment (UE) sending the remaining measured quality values of the feedback bits with a same number of bits, wherein the remaining measured quality values of the feedback bits are in a limited range.

14. The apparatus according to claim 13, wherein if the maximum value and the minimum value are in a same half value set of the predefined codebook of differential values, the resolution of the measured quality values is increased.

* * * * *